(12) United States Patent  
Kawamura et al.

(10) Patent No.: US 7,175,936 B2  
(45) Date of Patent: Feb. 13, 2007

(54) LITHIUM SECONDARY BATTERY AND ASSEMBLED STRUCTURE OF LITHIUM SECONDARY BATTERIES

(75) Inventors: Kenji Kawamura, Nagoya (JP); Kenshin Kitoh, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 377 days.

(21) Appl. No.: 10/260,746

(22) Filed: Sep. 30, 2002

(65) Prior Publication Data

US 2003/0064285 A1    Apr. 3, 2003

(30) Foreign Application Priority Data

Oct. 3, 2001   (JP)   ............... 2001-308095

(51) Int. Cl.  
*H01M 2/30*   (2006.01)  
*H01M 10/36*  (2006.01)

(52) U.S. Cl. .................. 429/94; 429/175; 429/53; 429/178; 429/211

(58) Field of Classification Search ........ 429/94, 429/178, 175, 211, 53  
See application file for complete search history.

(56) References Cited

U.S. PATENT DOCUMENTS

| | | | |
|---|---|---|---|
| 5,849,431 A * | 12/1998 | Kita et al. ............... | 429/164 |
| 6,139,986 A | 10/2000 | Kurokawa et al. | |
| 6,268,079 B1 | 7/2001 | Inoue et al. | |
| 6,399,242 B2 | 6/2002 | Kitoh et al. | |
| 6,579,640 B1 * | 6/2003 | Nagase et al. ............. | 429/54 |
| 6,709,786 B2 * | 3/2004 | Asaka et al. .............. | 429/158 |
| 2001/0049054 A1 | 12/2001 | Enomoto et al. | |
| 2002/0006540 A1 * | 1/2002 | Enomoto et al. ............ | 429/53 |
| 2003/0044677 A1 * | 3/2003 | Naruoka ..................... | 429/161 |

FOREIGN PATENT DOCUMENTS

| | | |
|---|---|---|
| CA | 2342123 | 9/2001 |
| EP | 0 987 778 | 3/2000 |
| EP | 1 139 458 | 10/2001 |
| JP | 11-154500 | 5/1999 |
| WO | 01/24303 | 4/2001 |

* cited by examiner

*Primary Examiner*—John S. Maples  
(74) *Attorney, Agent, or Firm*—Burr & Brown

(57) ABSTRACT

A lithium secondary battery 10 is provided with an inner electrode body 1 comprising a positive electrode plate and a negative electrode plate respectively made up of at least one metal foil 6 wound or laminated; said inner electrode body being impregnated with a non-aqueous electrolyte, current collector members 5A and 5B for leading a current out of this inner electrode body 1, a battery case 11 with both ends left open; said battery case housing the inner electrode body 1, and two caps 13 provided with internal terminals 14A and 14B thereon; said caps being used to seal the inner electrode body 1 at both open ends of the battery 11. By adopting such a configuration that positive and negative external terminals are placed on one end of a battery collectively, protrusions of the battery are so reduced that the collective coupling of batteries becomes easier.

32 Claims, 7 Drawing Sheets

LITHIUM SECONDARY BATTERY AND ASSEMBLED STRUCTURE OF LITHIUM SECONDARY BATTERIES

BACKGROUND OF THE INVENTION AND RELATED ART STATEMENT

The present invention relates to a lithium secondary battery (hereinafter simply referred to as "battery") and an assembled structure of lithium secondary batteries coupling structure (hereinafter simply referred to as "coupling structure"), and more particularly, to a lithium secondary battery with an excellent space-saving characteristic and an assembled structure of lithium secondary batteries with an excellent space-saving characteristic and excellent productivity.

Lithium secondary batteries are widely used as power supplies for portable communication devices and electronic devices such as notebook personal computers in recent years. Furthermore, with a growing international demand for saving of resources and saving of energy for global environmental protection, the development of lithium secondary batteries as motor drive batteries for electric-powered vehicles and hybrid electric-powered vehicles (hereinafter simply referred to as "electric-powered vehicle, etc.") is underway.

As shown in FIG. 9 and FIG. 10, this lithium secondary battery is generally constructed of an inner electrode body 1 made up of a positive electrode plate 2 and a negative electrode plate 3 arranged in such a way to wind around the periphery of a hollow cylindrical core 16 through the medium of a separator 4 and impregnated therein with a non-aqueous electrolyte, a cylindrical battery case 11 with both ends left open and being used for housing the inner electrode body 1 (sometimes hereinafter referred to as battery case), and two caps 13 for sealing the inner electrode body 1 at both open ends of the battery case 11.

Of the components described above, the caps need to be provided with a current leading function to lead a current generated in the inner electrode body outward, a depressurizing function to prevent bursting of the battery when a pressure inside the battery increases abnormally, and a function as an electrolyte inlet to inject an electrolyte into the inner electrode body housed in the battery case 11.

According to the battery in FIG. 9, the current leading function of this cap is often constructed by attaching a current collector tab 5A for the positive electrode and a current collector tab 5B for the negative electrode (hereinafter also referred to as "tabs 5A and 5B") to the positive electrode plate 2 and negative electrode plate 3 (hereinafter also referred to as "electrode plates 2 and 3) of the aforementioned inner electrode body 1 respectively, attaching the opposite ends of the tabs 5A and 5B connected to the electrode plates 2 and 3 to a positive internal terminal 14A and negative internal terminal 14B (hereinafter referred to as "internal terminals 14A and 14B") which are the members for temporarily collecting a current inside the cell and placing a positive external terminal 15A and a negative external terminal 15B (hereinafter also referred to as "external terminals 15A and 15B") which are the members electrically connected with the internal terminals 14A and 14B for leading the current out of the battery.

At this time, the positive and negative external terminals 15A and 15B are provided on both ends of the battery case 11. However, since external terminals need to have a protruding structure from the battery outward for functional reasons, there is a problem that a size of the battery grows accordingly, which requires a larger space for housing the battery in an intended place or portion.

On the other hand, when a lithium secondary battery is used for motor driving of an electric-powered vehicle, etc., many batteries are connected in series to secure a voltage necessary for driving the motor. Thus, depending on the assembled structure of lithium secondary batteries, a large space is required, which then causes a problem of reducing a volume energy density of the assembled structure of lithium secondary batteries.

SUMMARY OF THE INVENTION

The present invention has been achieved in view of the conventional problems described above and it is an object of the present invention to provide a lithium secondary battery capable of improving a space-saving characteristic by adopting a configuration of placing the positive and negative external terminals at one end of the battery and thereby reducing the protruding parts of the battery.

It is another object of the present invention to provide an assembled structure of lithium secondary batteries capable of improving a space-saving characteristic and productivity by adopting a configuration of placing the positive and negative external terminals at one end of the batteries to be used to reduce the protruding parts of the battery and simplifying connections among the batteries.

That is, the present invention provides a lithium secondary battery provided with an inner electrode body made up of a positive electrode plate and a negative electrode plate respectively composed of at least one metal foil, wound or laminated and impregnated therein with a non-aqueous electrolyte, current collector members for leading a current out of this inner electrode body, a battery case with both ends left open and used for housing the inner electrode body and two caps for sealing the inner electrode body at both open ends of the battery case and having terminals thereon, characterized in that a positive and negative external terminals are formed on one of the two caps for the battery case.

In addition to the above configuration, it is preferable for the present invention to further include a hollow cylindrical core, form the positive electrode plate and negative electrode plate in such a way as to wind around the periphery of the core, have the cylindrical battery case and use a tube as the material of the battery case. Furthermore, in the present invention, caps are provided at both open ends of the battery case, and it is preferable to form the positive and negative external terminals on one of the caps and form a depressurization hole on the other cap.

Furthermore, it is preferable to form a necking section in an area closest to the outer edge of the cap on which the positive and negative external terminals are formed and/or the cap in which the depressurization hole is formed. For the cap with the depressurization hole, it is preferable to provide the depressurization hole at a position corresponding to the center axis of the core. It is preferable for the center axis of the core to be coaxial with the center axis of the battery case and it is preferable that the core be made of Al or an alloy of Al.

Furthermore, it is preferable that the depressurization hole is positioned on a portion of the cap to enable it to serve as an electrolyte inlet and that the core be provided with one or more holes or slits that communicate with the interior of the battery case.

Furthermore, it is preferable for the present invention to form the battery caps on one of which the positive and negative external terminals are formed including an electrically insulating elastic body so that the positive and negative electrodes are electrically insulated, use a packing processed to a predetermined size as the elastic body and use any one of ethylene-propylene rubber, polyethylene, polypropylene or fluorocarbon resin as the packing.

Furthermore, it is preferable to use caulking and/or welding as the method of joining the battery case and battery caps. It is preferable that the battery case be charged positively and that the battery case be made of Al or an alloy of Al. Furthermore, it is preferred that the cap provided with the depressurization hole is composed of a tabular member having the function as a cover, an elastic body of a predetermined size, a metal foil and a spacer, and that said cap is manufactured by placing the elastic body and metal foil at predetermined positions, forming a depressurization mechanism unit by combining the elastic body and metal foil with the spacer, and fitting the depressurization mechanism unit into the tabular member.

According to the present invention, the current collector member may also be made up of a plurality of strip-shaped current collector tabs and formed with one end of the plurality of strip-shaped current collector tabs attached to an edge of at least one metal foil that makes up the positive electrode plate and/or negative electrode plate and the other end of the plurality of strip-shaped current collector tabs connected to the internal terminal.

Furthermore, according to the present invention, the current collector member may also be a current collector plate having a predetermined shape and a configuration whereby a current is led out of the inner electrode body by joining the edges of at least one metal foil making up the positive electrode plate and/or negative electrode plate or the edges (joint edges) arranged to be joined with predetermined locations of the current collector member may be joined with the predetermined locations of the current collector member or the current collector member may be connected to the internal terminal using an electrode lead member.

According to the present invention, the positive external terminal and negative external terminal may also be made of different types of metal. More specifically, there may be a case where the positive external terminal is Al or an alloy of Al and the negative external terminal is Cu or an alloy of Cu or a case where the positive external terminal is Al or an alloy of Al and the negative external terminal member is Ni or an alloy of Ni.

The lithium secondary battery of the present invention is ideally applicable to a battery with a large capacity of 2 Ah or above. It is also ideally applicable as a vehicle-mounted battery and ideally used as an engine starting power supply requiring high output and as a motor drive power supply, etc. for an electric-powered vehicle or hybrid electric-powered vehicle in which a high current is frequently discharged.

Furthermore, the present invention provides an assembled structure of lithium secondary batteries, characterized in that using a plurality of the aforementioned lithium secondary batteries, the positive external terminal of any one of the plurality of lithium secondary batteries is connected to the negative external terminals of a lithium secondary battery other than the lithium secondary battery having this positive external terminal using bus bars.

According to the present invention, it is preferable to form a bus bar by joining different types of metal, and more specifically, there may be a case where the positive external terminal is Al or an alloy of Al and the negative external terminal member is Cu or an alloy of Cu and the bus bar is formed by joining a member whose principal component is Al and another member whose principal component is Cu or a case where the positive external terminal is Al or an alloy of Al and the negative external terminal member is Ni or an alloy of Ni and the bus bar is formed by joining a member whose principal component is Al and another member whose principal component is Ni.

It is preferable to manufacture the bus bar using at least one method selected from a group of methods of friction bonding, brazing, welding, caulking, rolling, forged caulking, press fitting, enveloped casting and blasting bonding. Furthermore, it is preferable that a plurality of lithium secondary batteries be placed side by side and depressurization holes made in the caps of the lithium secondary batteries be provided on the same plane.

The configuration conditions of the assembled structure of lithium secondary batteries according to the present invention are ideally applicable to a lithium secondary battery with a large cell capacity equal to or greater than 2 Ah. It is also ideally applicable when the lithium secondary battery is a vehicle-mounted cell and ideally applicable as an assembled structure of lithium secondary batteries for an engine starting power supply requiring high output and as a motor drive power supply, etc. of an electric-powered vehicle or hybrid electric-powered vehicle in which a high current is frequently discharged.

Figure 1:
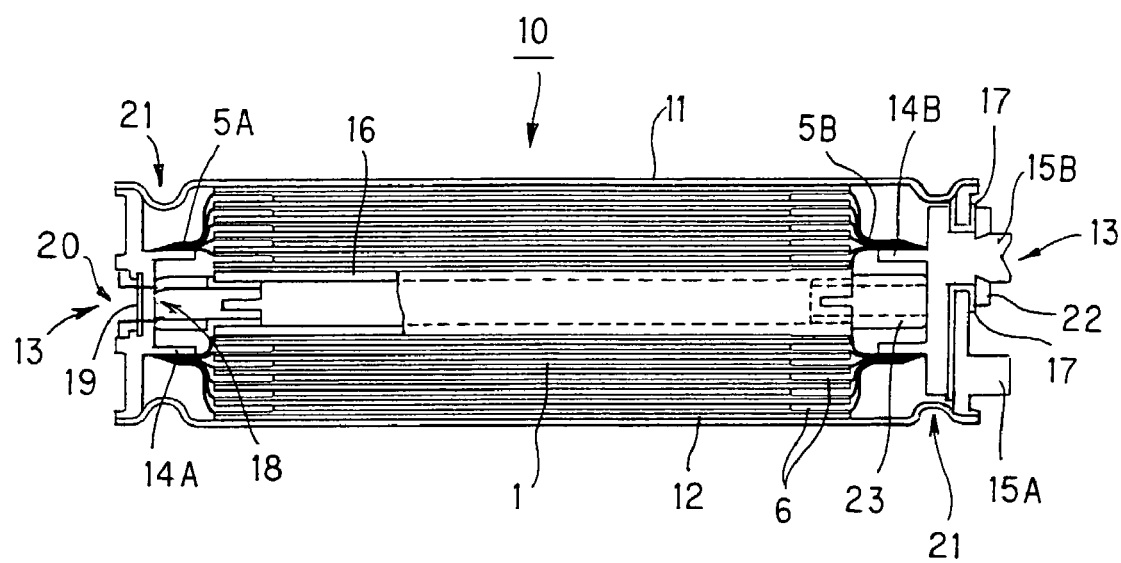
FIG. 1 is a cross-sectional view showing an embodiment of a lithium secondary battery of the present invention.

In the accompanied drawings, the following numerical references show the respective part, portion, or the like as specified below:
1 Inner electrode body
2 Positive electrode plate
3 Negative electrode plate
4 Separator
5A Positive current collector tab (current collector member)
5B Negative current collector tab (current collector member)
6 Metal foil
7A Positive current collector member (current collector plate)
7B Negative current collector member (current collector plate)
8A Positive electrode lead member
8B Negative electrode lead member
10 Battery
11 Battery case
12 Insulating polymer film
13 Cap
14A Positive internal terminal
14B Negative internal terminal
15A Positive external terminal
15B Negative external terminal
16 Core
17 Elastic body (packing)
18 Depressurization hole
19 Metal foil
20 Depressurization valve
21 Necking section
22 Fixing material
23 Vibration prevention member
24 Tabular member
25 Elastic body
26 Spacer
27 Adhesive
28 Depressurization mechanism unit
30 Nozzle
31 Electrolyte inlet
40 Bus bar
41 Al material
42 Cu material or Ni material
43 Joint
44 Assembled structure of the batteries

DETAILED DESCRIPTION OF PREFERRED EMBODIMENT

Embodiments of the present invention will be explained below, and it goes without saying that the present invention will not be limited to the following embodiments.

Figure 2:
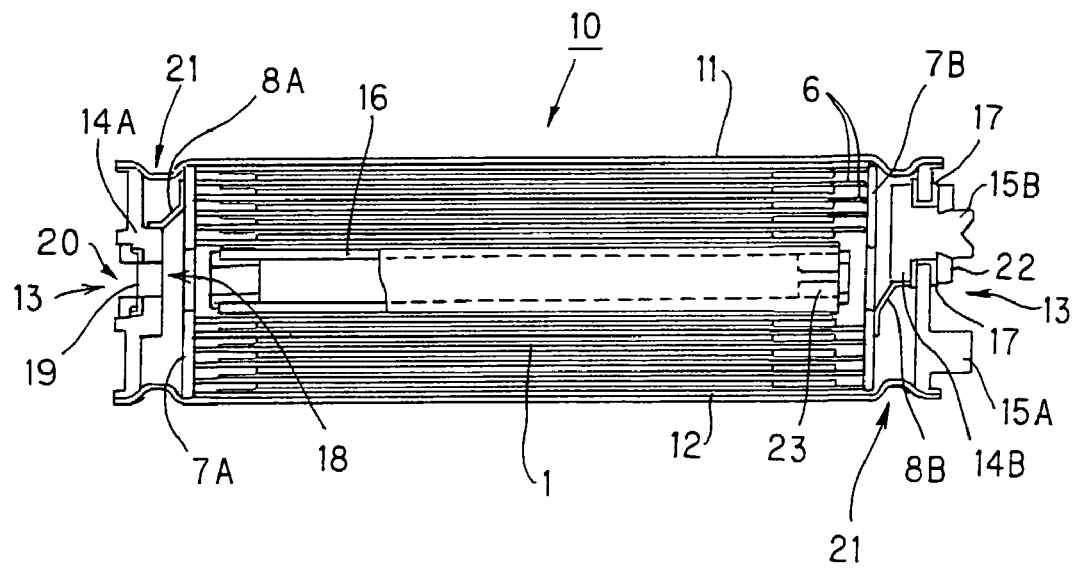
FIG. 2 is a cross-sectional view showing another embodiment of the lithium secondary battery of the present invention.

As shown in FIG. 1 and FIG. 2, a lithium secondary battery according to the present invention is a lithium secondary battery 10 including an inner electrode body 1 containing a positive electrode plate and a negative electrode plate respectively made up of at least one metal foil 6 wound or laminated and said electrode body being impregnated in a non-aqueous electrolyte, a battery case 11 with both ends left open; said case housing a current collector member for leading a current out of this inner electrode body 1 and the inner electrode body 1 therein, and two caps 13 sealing the inner electrode body 1 at both open ends of the battery case 11; said caps being provided with internal terminals 14A and 14B, and is constructed in such a way that positive and negative external terminals 15A and 15B are formed on one of the two caps for the battery case 13. In this case, in addition to this configuration, it is preferable to provide a hollow cylindrical core 16 and make the positive electrode plate and negative electrode plate wound around the periphery of the core 16. It is also preferable to make the battery case 11 in a cylindrical form and use a tube as the material for the battery case.

The present invention places both the positive and negative external terminals on one of the caps, which eliminates the protruding part of the other cap, making it possible to improve a space-saving characteristic of the lithium secondary battery. It goes without saying that this also leads to an improvement of energy density of the battery.

For the lithium secondary battery of the present invention, it is preferable to form a necking section 21 in the area closest to the outer edge of the cap 13 on which the positive and negative external terminals are formed and/or the cap 13 on which a depressurization hole 18 is formed because the positioning and fixation of caps may be attained easily when the case is closed with caps. According to the present invention, as will be partially described later, the cap 13 is formed by welding/fixing a tabular member whose depressurization hole constitutes a hole to the battery case 11, then forming the necking section 21 in the area closest to the outer edge of the tabular member and fitting a depressurization mechanism unit with which the depressurization hole is integrated into the tabular member. When the depressurization mechanism unit is fitted, if the necking section 21 has been formed in the area closest to the outer edge of the tabular member, it is possible to spread fitting stress not only to the welded section but also the necking section, which improves safety in production and yield as well.

Furthermore, for the lithium secondary battery of the present invention, it is preferable to form the positive and negative external terminals 15A and 15B on one of the two caps 13 and at the same time form a depressurization hole in the other cap 13. In this case, it is preferred that the depressurization hole for the cap is formed in the position corresponding to the center axis of the core when the the depressurization hole is formed on the cap. In this case, it is preferable that the center axis of the core be coaxial with the center axis of the battery case.

With the lithium secondary battery, the inner electrode body is normally placed in the center of the cell and when a cylindrical inner electrode body is used, the center axis of the core is necessarily placed coaxial with the center axis of the battery case. In this case, if a circular depressurization hole is provided at the position corresponding to the center axis of the core, the depressurization hole allows the cap to be formed rotationally symmetric with respect to the core of the inner electrode body. Since the cap is rotationally symmetric, it is possible to form the cap only through rotational processing using a lathe, etc. centered on the rotational axis, which makes manufacturing extremely easy and makes it possible to drastically reduce machining costs. At this time, the core is preferably made of Al or an alloy of Al. This is because these materials have appropriate hardness and good moldability.

Furthermore, for the lithium secondary battery, it is preferable that the depressurization hole also serves as the electrolyte inlet. Placing the depressurization hole at the center of the cap as in the case of the lithium secondary battery of the present invention makes it possible to use the depressurization hole as the electrolyte inlet. That is, as shown in FIG. 1, placing the depressurization hole 18 at the center of the cap 13 and placing the core 16 of the inner electrode body 1 at the center of the battery 10 makes it possible to use the depressurization hole 18 to inject an electrolyte. This shortens the time to inject the electrolyte, reduces loss of the electrolyte, eliminates the need to provide a hole to inject the electrolyte aside from the depressurization hole 18 and reduces the area of the hole of the cell, thus making it possible to drastically reduce the probability of leakage of the electrolyte. At this time, in order to improve permeability of a non-aqueous electrolyte and depressurization characteristic of the electrolyte, it is preferable to use one or more holes or slits that communicate with the interior of the battery case as the core.

Furthermore, for the lithium secondary battery of the present invention, it is preferable to form the cap on which the positive and negative external terminals are formed by sandwiching an electrically insulating elastic body. As will be described later, the battery 10 in FIG. 1 is formed by directly joining the case 11 made of Al with the cap 13 made of Al or Cu using a method such as caulking and/or welding, and therefore the battery case 11 is electrically conductive with both the positive and negative electrodes. Thus, it is necessary to insulate the positive electrode from the negative electrode inside the case, and in the case of the battery of the present invention, this insulation is attained by using an elastic body 17, which is an electrically insulating member, in a part of the cap on which the external terminals are formed, and thus the battery case 11 is charged positively. At this time, for the elastic body 17, it is preferable to use an elastic body having been processed to a predetermined size beforehand, that is, a packing, and examples of its specific materials include ethylenepropylene rubber, polyethylene, polypropylene or fluorocarbon resin. These types of resin have excellent corrosion resistance, and even if the non-aqueous electrolyte includes a carbonate ester-based organic solvent, its reliability is secured.

For the present invention, it is preferable to form the joint between the battery case and caps using methods such as caulking and/or welding. When a caulking method is used as a method of joining the battery case and the caps in the present invention, it is preferable to satisfy a relationship $R_{body} > R_{top}$ where $R_{body}$ is the diameter (mm) of the body of the cell and $R_{top}$ is the diameter (mm) between both ends of the caulked part. As to further details, refer to WO 01/59856 A1. Furthermore, when welding is used as the method of joining the battery case and the caps in the present invention, it is preferable to use a YAG laser as the energy source during welding work. In this case, it is preferable to weld the tip of the battery case and the entire outer edge of the caps to ensure sealing.

Since this welding is performed before injecting the electrolyte, it is not necessary to consider deterioration of the electrolyte and the range within which the welding condition is ideally applicable is wider than that when the electrolyte has already been injected, but since a resin component (separator) is used for the inner electrode body, there is a limit on the welding temperature.

To suppress a temperature increase of the cell during welding, it is preferable to use a welding method with a high input energy density, and more specifically, it is preferable to use a welding method ensuring that the temperature is 100° C. or below. Examples of such a welding method includes laser welding and electronic beam welding whereby a welding beam (arc) is focused. Laser welding allows welding in an atmosphere, requires only a simple apparatus and provides high productivity. On the contrary, electronic beam welding needs to be performed in a vacuum state and therefore requires higher costs depending on the apparatus and also increases the number of manufacturing processes.

Among other laser welding methods, the YAG laser welding used in the present invention provides a high beam energy density, allows welding of Al in a short time and reduces a temperature rise to a minimum, and therefore makes it possible to realize welding with high reliability.

According to the present invention, it is preferable to use a battery case made of Al or an alloy of Al. Battery cases of such materials are commercially available in various diameters, and therefore such battery cases are easily available and inexpensive as well. Moreover, Al and an alloy of Al are light, and therefore it is possible to implement lighter cells and improve a weight energy density and weight output density of the cell. Furthermore, using such an battery case when molding the cell also has an advantage of making caulking and necking easier. "Al" refers to pure Al, but Al with purity of 90% or higher can be used without problems.

When Al is used as the material of the battery case, using the same material of Al for the battery case and the caps to be welded to the battery case improves penetration and allows uniform and reliable welding which has the effect of integrating the battery case with the caps. Al has high electrical conductivity and is a material often conventionally used as the external terminal.

Figures 8A, 8B:
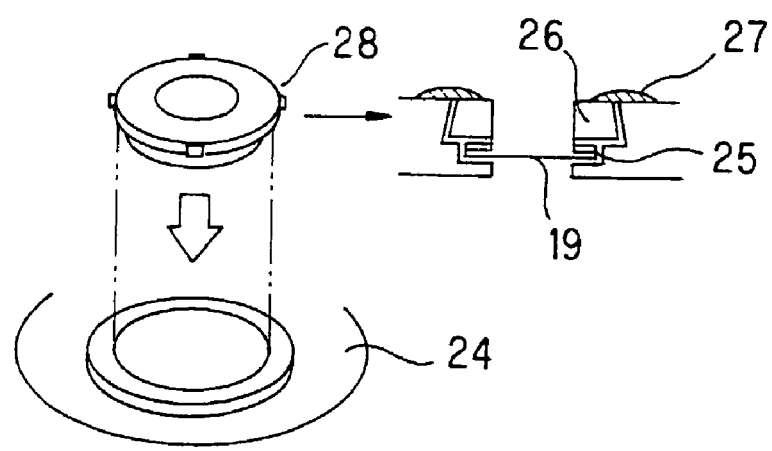
FIG. 8($a$) is a perspective view, and FIG. 8($b$) is a cross-sectional view showing an embodiment of components of a depressurization valve ideally applicable to the lithium secondary battery of the present invention.
Figure 9:
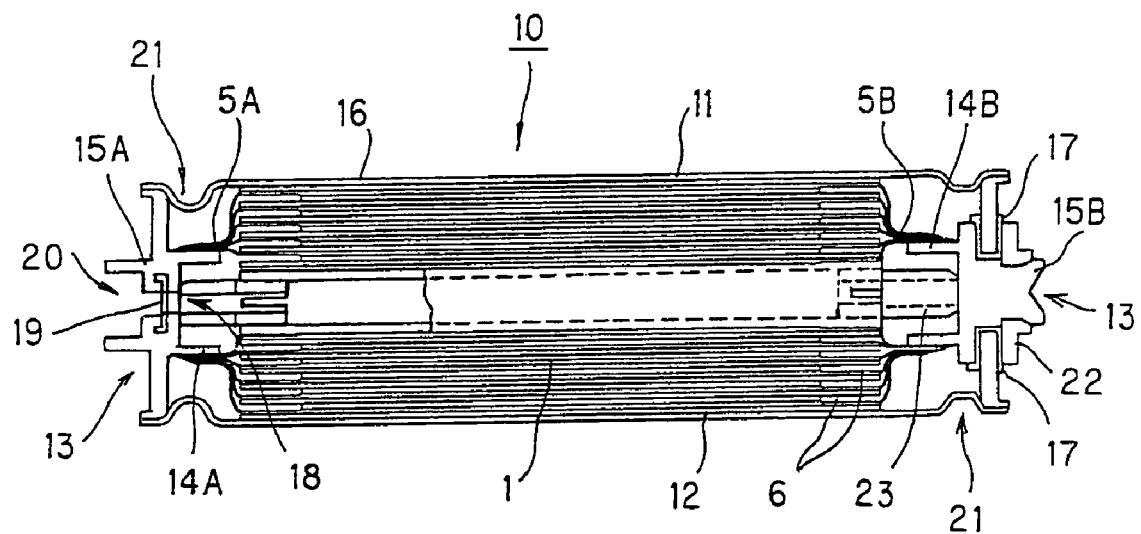
FIG. 9 is a cross-sectional view showing an embodiment of a conventional lithium secondary battery.
Figure 10:
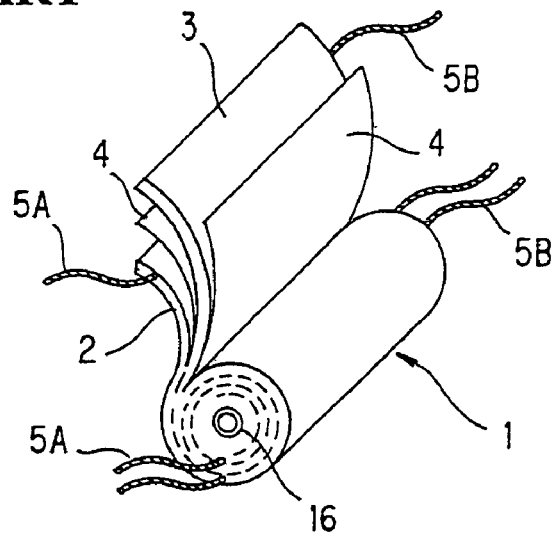
FIG. 10 is a perspective view showing an embodiment of a structure of a roll type inner electrode body.

Furthermore, as shown in FIGS. 8(a) and (b), for the lithium secondary battery of the present invention, it is preferable that the cap in which the depressurization hole is formed include a tabular member 24 having the function as a cover, an elastic body 25 of a predetermined size, a metal foil 19 and a spacer 26 and that the elastic body 25 and metal foil 19 be placed at predetermined positions, combined with the spacer 26 into a depressurization mechanism unit 28 and that the depressurization mechanism unit 28 be fitted into the tabular member 24. This allows the depressurization hole to be completed by only fitting the depressurization mechanism unit 28 into the cap, making it possible to improve productivity of the lithium secondary battery. By the way, reference numeral 27 denotes an adhesive.

Figures 3A, 3B:
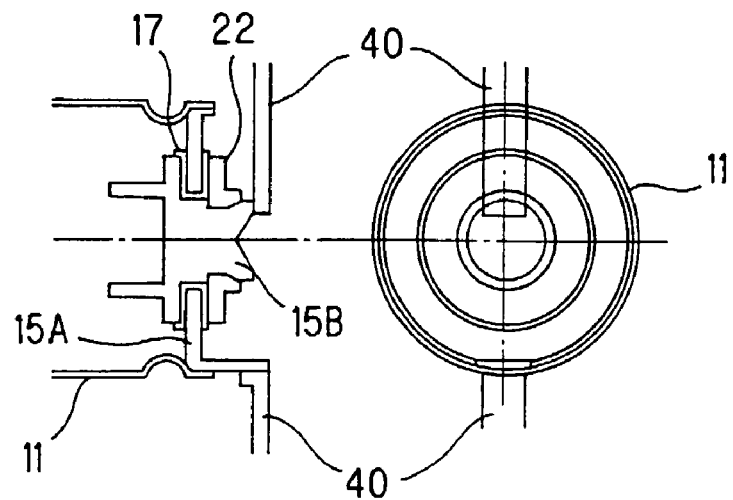
FIG. 3($a$) is a cross-sectional view, and FIG. 3($b$) is a top view of a cap being provided with an insulating function of the lithium secondary battery of the present invention.

Then, the cap on which the aforementioned positive and negative external terminals are formed will be explained in further detail. FIG. 3(a) is a cross-sectional view showing an embodiment of the cap being provided with an insulating function, and FIG. 3(b) is a top view. The cap shown in FIG. 3(a) is constructed of an L-figured positive external terminal 15A, a negative external terminal 15B having a concave top surface and L-figured and bulky bus bars 40. Thus, the cap shown in FIG. 3(a) (1) makes it possible to easily align the welding positions of the positive external terminal 15A and bus bar 40 with the welding positions of the negative external terminal 15B and bus bar and facilitates welding between the bus bars and external terminals. Furthermore, (2) being a member with a simple shape, the positive external terminal 15A can be molded easily by press working, etc. and manufactured extremely simply. Furthermore, (3) when a plurality of batteries arranged side by side for connection are connected, it is possible to simply adjust positional variations between neighboring positive external terminal and negative external terminal, making welding and bonding between the external terminals of the respective batteries and bus bars very simple.

Figures 4A, 4B:
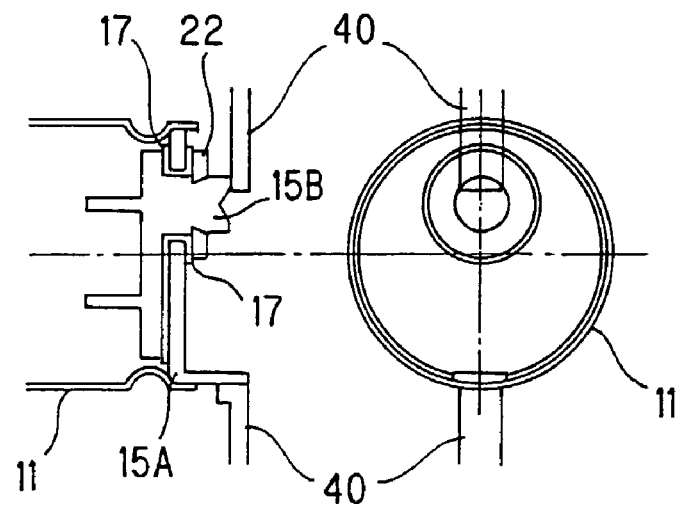
FIG. 4($a$) is a cross-sectional view, and FIG. 4($b$) is a top view showing another embodiment of the cap being provided with an insulating function usable for the lithium secondary battery of the present invention.

FIG. 4(a) is a cross-sectional view showing another embodiment of the cap having an insulating function, and FIG. 4(b) is a top view. With the cap shown in FIG. 4(a), the structures of the positive and negative external terminals 15A and 15B and the coupling structure between the positive and negative external terminals 15A and 15B and bus bar 40 are basically identical to those of the cap shown in FIGS. 3(*a*) and (*b*), but the negative external terminal 15B is smaller than that of the cap shown in FIGS. 3(*a*) and (*b*), and the negative external terminal 15B is placed close to the end of the cap. Thus, the cap shown in FIGS. 4(*a*) and (*b*) can provide a sufficient distance between the position where the positive external terminal 15A and the bus bar 40 are connected and the position where the negative external terminal 15B and the bus bar 40 are connected, thus reducing the risk of shorting the positive and negative electrodes during welding. Furthermore, the negative external terminal 15B is placed close to the end of the cap and the bus bar 40 can be shortened accordingly, which also leads to a cost reduction. Furthermore, since the same basic structures as those of the caps and the positive and negative external terminals 15A and 15B in FIG. 3(*a*) are used, it goes without saying that the merits (1) to (3) described in detail with the cap shown in FIGS. 3(*a*) and (*b*) are also attained.

Figures 5A, 5B:
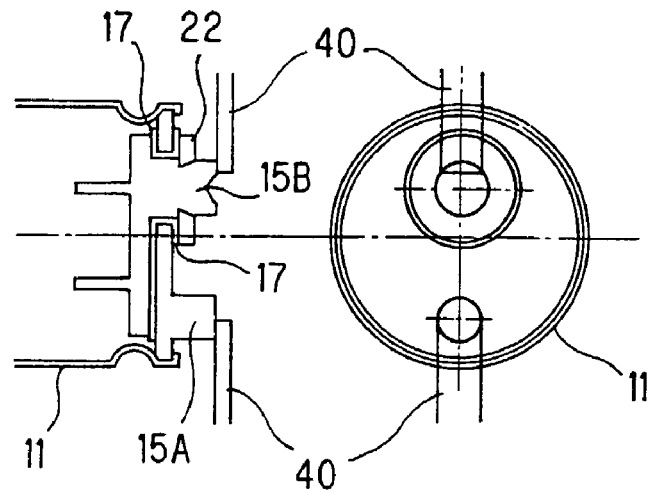
FIG. 5($a$) is a cross-sectional view, and FIG. 5($b$) is a top view showing a further embodiment of the cap being provided with an insulating function for the lithium secondary battery of the present invention.

FIG. 5(*a*) is a cross-sectional view showing a further embodiment of the cap being provided with an insulating function and FIG. 5(*b*) is a top view. With the cap shown in FIGS. 5(*a*) and (*b*), the structure and location of the negative external terminal 15B and the coupling structure between the negative external terminal 15B and bus bar 40 are basically identical to those of the cap shown in FIGS. 4(*a*) and (*b*), but the top surface of the positive external terminal 15A is wider than that of the cap shown in FIG. 4(*a*) and the bulky-shaped bus bar 40 is connected to the top surface thereof. Thus, the cap shown in FIGS. 5(*a*) and (*b*) can secure a sufficient area of connection between the positive external terminal 15A and the bus bar 40, and can thereby cover higher currents. Furthermore, in FIG. 5(*a*), the positive and negative external terminals 15A and 15B have different shapes, but if the same concave part as that of the negative electrode is also formed in the positive external terminal 15A, the positive and negative electrodes have external terminals of the same shape, making it possible to apply a common jig/tool and welding pattern. Furthermore, since this cap has the same structure as that of the cap shown in FIGS. 3(*a*) and (*b*), it goes without saying that the merits (1) and (2) described in detail with the cap shown in FIGS. 3(*a*) and (*b*) are also attained.

Figures 6A, 6B:
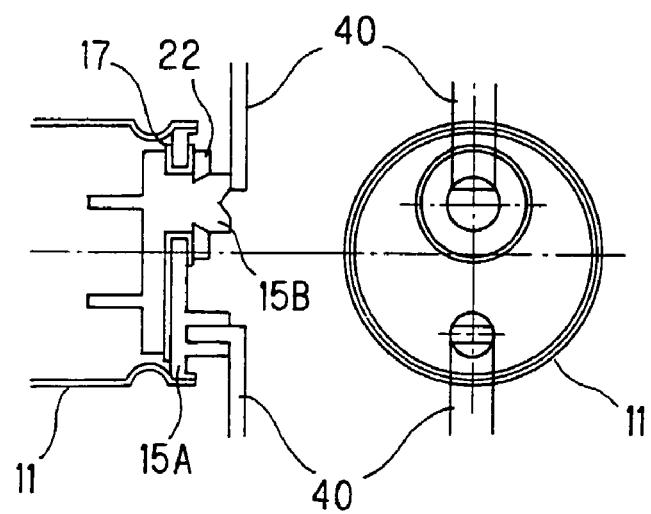
FIG. 6($a$) is a cross-sectional view, and FIG. 6($b$) is a top view showing a still further embodiment of the cap being provided with an insulating function of the lithium secondary battery of the present invention.

FIG. 6(*a*) is a cross-sectional view showing a still further embodiment of the cap being provided with an insulating function and FIG. 6(*b*) is a top view. While the cap shown in FIGS. 6(*a*) and (*b*) has the structure and location of the negative external terminal 15B and the coupling structure between the negative external terminal 15B and bus bar 40 identical to those of the cap shown in FIGS. 4(*a*) and (*b*), this cap adopts a configuration whereby a concave section is formed in the positive external terminal 15A of the cap shown in FIG. 4(*a*) to allow the tip of the bus bar 40 to be inserted and the tip of the bus bar 40 is inserted into the concave section and connected thereto. Thus, the cap shown in FIGS. 6(*a*) and (*b*) has the bus bar 40 inserted and fixed in the positive external terminal 15A, which suppresses the movement of the bus bar 40 during welding work making the bus bar less likely to be displaced. Furthermore, adopting a structure of inserting the bus bar into the external terminal makes the positioning of the bus bar easier and facilitates the automation of connections. Furthermore, when the bus bar is inserted into the external terminal, applying caulking, etc. to that part can reduce the gap, which provides a favorable welding condition. Moreover, since this cap has the same structure as that of the cap shown in FIG. 3(*a*), it goes without saying that the merits (1) and (2) described in detail with the cap shown in FIG. 3(*a*) are also attained.

Figures 7A, 7B:
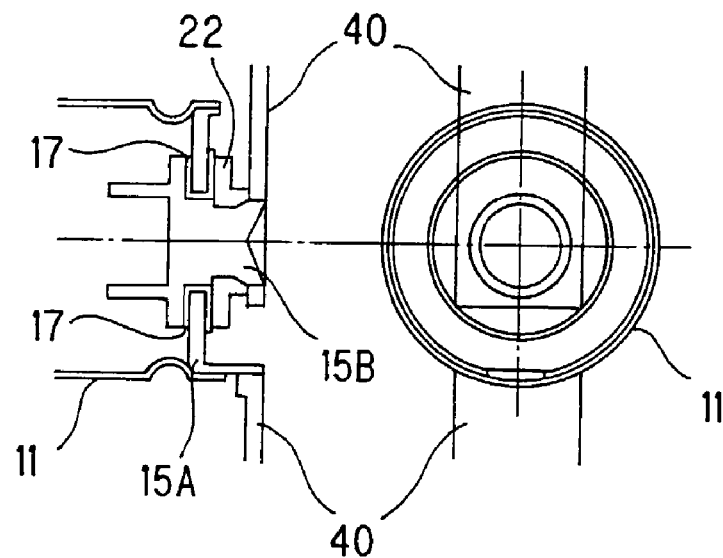
FIG. 7($a$) is a cross-sectional view, and FIG. 7($b$) is a top view showing a still further embodiment of the cap being provided with an insulating function of the lithium secondary battery of the present invention.

FIG. 7(*a*) is a cross-sectional view showing a still further embodiment of the cap being provided with an insulating function and FIG. 7(*b*) is a top view. While the cap shown in FIGS. 7(*a*) and (*b*) has the structures of the positive and negative external terminals 15A and 15B and the coupling structure between the positive and negative external terminals 15A and 15B and the bus bar 40 basically identical to those of the cap shown in FIG. 3(*a*), this embodiment adopts a configuration with a wider bus bar 40 connected to the negative external terminal 15B and with a greater area of connection between the negative external terminal 15B and bus bar 40 than those of the cap shown in FIG. 3(*a*). Thus, the cap shown in FIG. 7(*a*) can secure a sufficient area of connection between the negative external terminal 15B and the bus bar 40, and can thereby cover higher currents. Moreover, since this embodiment has the same basic structures of the cap and the positive and negative external terminals as those shown in FIG. 3(*a*), it goes without saying that the merits (1) to (3) described in detail with the cap shown in FIG. 3(*a*) are also attained.

Then, with regard to the lithium secondary battery according to the present invention, the structure of coupling between the inner electrode body 1 and caps 13 will be explained with reference to FIG. 1 and FIG. 2.

The structure for coupling between the inner electrode body 1 and caps 13 of the lithium secondary battery in FIG. 1 is formed in such a way that the current collector member consists of a plurality of strip-shaped current collector tabs 5A and 5B, one end of a plurality of strip-shaped current collector tabs 5A and 5B is attached to the edge of at least one metal foil 6 making up the positive electrode plate and/or negative electrode plate and the other end of the plurality of strip-shaped current collector tabs 5A and 5B is connected to the internal terminals 14A and 14B. More specifically, the positive electrode plate current collector tab 5A and the negative electrode plate current collector tab 5B are connected to the metal foil 6 (positive electrode plate or negative electrode plate) of the inner electrode body 1 using ultrasonic welding first and then the other ends of the positive electrode plate current collector tab 5A and the negative electrode plate current collector tab 5B attached to both ends of the inner electrode body 1 can be connected to the positive internal terminal 14A and negative internal terminal 14B respectively using ultrasonic welding or laser welding.

The structure of coupling between the inner electrode body 1 and caps 13 of the lithium secondary battery in FIG. 2 is formed in such a way that the current collector members are the current collector plates 7A and 7B of a predetermined shape, the edges of at least one metal foil 6 making up the positive electrode plate and/or negative electrode plate are joined with the predetermined locations of the current collector plates 7A and 7B to thereby lead a current out of the inner electrode body 1 and of the edges of the metal foil 6, the edges arranged to be joined with the predetermined locations of the current collector plates 7A and 7B (joint edges) are joined with the predetermined locations of the current collector plates 7A and 7B.

In other words, the "joint edges" refer to the edges of the metal foils with edges arranged so that coupling between the metal foils and the current collector plates is made easier and the coupling resistance between the metal foils and current collector plates is suppressed. In practice, with the battery 10, the two edges of the metal foil 6 constitute joint edges and both edges are joined with the current collector plates 7A and 7B. At this time, the current collector plates 7A and 7B may also be connected to the internal terminals 14A and 14B using electrode lead members 8A and 8B. The electrode lead members 8A and 8B are preferably constructed of the same type of metal as that of the current collector plates 7A and 7B and the internal terminals 14A and 14B connected. More specifically, when Al or an alloy of Al is used for the positive internal terminal 14A and positive current collector plate 7A, it is preferable to adopt Al or an alloy of Al for the positive electrode lead member 8A and when Cu or an alloy of Cu is used for the negative internal terminal 14B and negative current collector plate 7B, it is preferable to adopt Cu or an alloy of Cu for the negative electrode lead member 8B. For details of the method of coupling the current collector plates 7A and 7B and metal foil 6, refer to Japanese Patent Application No.2001-135425 previously filed by the present inventors et al.

Furthermore, according to the present invention, the positive external terminal and negative external terminal may also be constructed of different types of metal. For a lithium secondary battery, Al can be used for all current collector members, external terminals and internal terminals on the positive electrode side, while Al cannot be used for the current collector members on the negative electrode side due to electrochemical reaction on the negative electrode, and Cu or Ni is used instead. Thus, in order to reduce current collector resistance from the current collector members, it is preferable to use Cu for the negative internal terminal when the current collector member is Cu and use Ni or Cu for the negative internal terminal when the electrode lead is Ni. Then, for the external terminal formed integral with the internal terminal, it is preferable to use the same material as that of the internal terminals of the positive and negative electrodes for convenience of manufacturing of the cap. Therefore, it is preferable that the positive external terminal and negative external terminal be made of different types of metal, and more specifically, there may be a case where the positive external terminal is Al or an alloy of Al and the negative external terminal is Cu or an alloy of Cu or a case where the positive external terminal is Al or an alloy of Al and the negative external terminal is Ni or an alloy of Ni. When terminals are said to be made of Al, Cu and Ni in the present invention, Al, Cu and Ni with the degree of purity of 90% or higher are ideally applicable.

Figure 11:
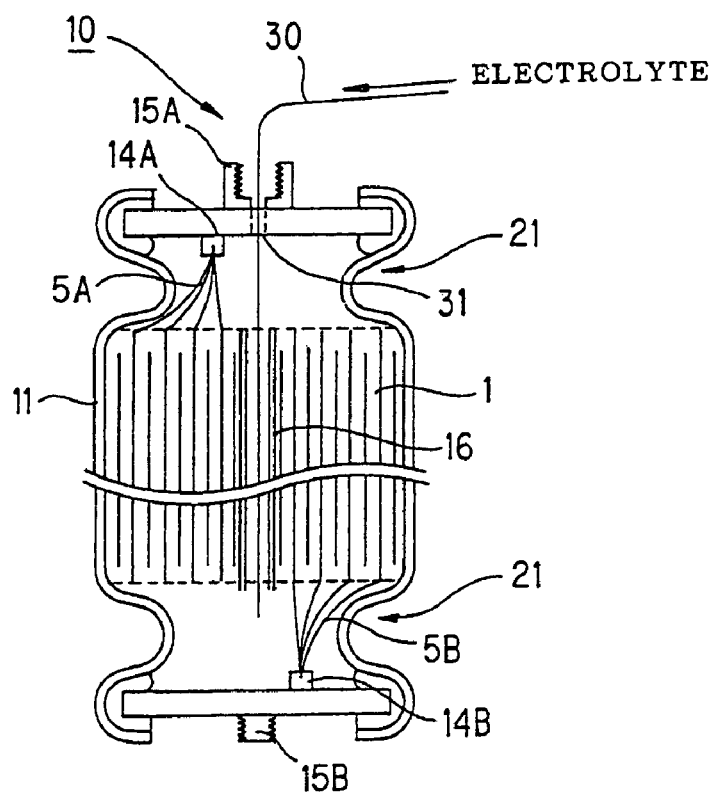
FIG. 11 is cross-sectional view showing an example of a method of filling an electrolyte for the lithium secondary battery.

There are no particular restrictions on the method of injecting electrolytes according to the present invention, but the following method is ideally applicable to the lithium secondary battery according to the present invention having the above described structure. At the time of refilling the cell with the electrolyte, the interior of the cell is vacuum-sealed using a vacuum pump and the electrolyte is injected from the electrolyte inlet 31 using a pressure difference from the atmosphere as shown in FIG. 11. Here, it is preferable to set the degree of vacuum to a higher level than 0.1 torr (13.3 Pa).

While impregnation of the electrolyte is in progress, it is preferable to keep a degree of vacuum in a range in which the electrolyte does not boil and the degree of vacuum at this time greatly depends on the physical property of the solvent that composes the electrolyte used. Furthermore, as the material of a nozzle 30, metal or resin that will not be affected by corrosion by the electrolyte is used and the nozzle 30 is connected to an electrolyte storage tank through a tube or pipe, etc. and the electrolyte is sent from the electrolyte storage tank using a metering pump, etc.

Thus, when the cell is filled with the electrolyte from the lower part of the cell, the inner electrode body 1 is impregnated from bottom to top and bubbles generated from the inner electrode body 1 can pass through space free of electrolyte impregnation, which allows efficient impregnation of the electrolyte. This makes it possible to shorten the electrolyte injection time and even if the electrolyte contains a highly volatile solvent, the amount of its evaporation is suppressed to a minimum, preventing deterioration of characteristics of the electrolyte.

Then, when the impregnation processing of the electrolyte is completed, the periphery of the electrolyte inlet is purged with an inert gas such as nitrogen or argon and the surplus electrolyte remaining in the cell will be drained out using the nozzle 30. At this time, in order to drain a maximum amount of the surplus electrolyte filling the space of the positive internal terminal, it is preferable that the tip of the nozzle 30 be inserted up to the bottom of the cell.

Finally, the electrolyte inlet 31 is blocked using a simple method of sealing such as use of a screw or filling of a sealant from outside. If this blocking is made possible by using a simple method, it is possible to reduce the installation cost and the amount of purge gas used.

The embodiments of the lithium secondary battery according to the present invention have been explained, but it goes without saying that the present invention is not limited to those embodiments. The configuration condition for the lithium secondary battery according to the present invention is ideally applicable to a cell whose capacity is 2 Ah or above. It goes without saying that the use of the cell is not limited, but the present invention is ideally applicable as a vehicle-mounted large capacity cell requiring high output, low internal resistance and excellent cycle characteristic to start the engine or to drive the motor of an electric-powered vehicle or hybrid electric-powered vehicle.

Figure 12:
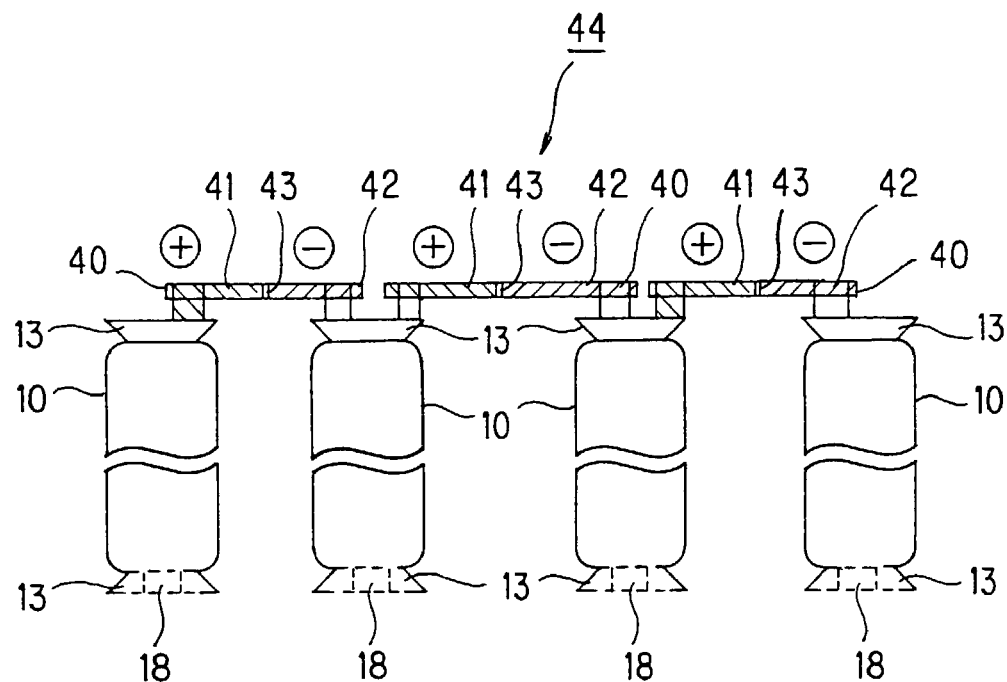
FIG. 12 is a cross-sectional view showing an embodiment of an assembled structure of lithium secondary batteries of the present invention.

Furthermore, the assembled structure of lithium secondary batteries according to the present invention can be constructed by using a plurality of the aforementioned lithium secondary batteries and connecting the positive external terminal of any one of the plurality of the lithium secondary batteries and the negative external terminal of the lithium secondary battery other than the lithium secondary battery having this positive external terminal using a bus bar. As shown in FIG. 12, the "bus bar" here refers to a member for connecting one positive external terminal of the lithium secondary battery 10 and the negative external terminal of another lithium secondary battery 10, which is made of a metallic material with good electrical conductivity and small resistance of coupling with the external terminal, and a punching metal or mesh can be used ideally as its form.

Using this coupling structure fixes the batteries individually using an appropriate frame, makes it possible to vertically or horizontally stack and store the batteries 10 allowing for compact storage of many batteries 10.

For the assembled structure of lithium secondary batteries according to the present invention, it is preferable to form the bus bar by bonding different types of metal. For the lithium secondary battery as described above, it is necessary to use an Al material for the positive internal terminal and a Cu material or Ni material for the negative internal terminal due to electrochemical reaction between the positive and negative electrodes. Furthermore, when a current connection resistance is taken into consideration, it is preferable that the positive external terminal and negative external terminal to be connected and the bus bars be made of the same material. Thus, the present invention uses different materials for the positive external terminal and the negative external terminal and uses the same material for the bus bars and the respective external terminals, and thereby suppresses the connection resistance.

More specifically, it is preferable to form the coupling structure by joining the positive external terminal made of Al or an alloy of Al, the negative external terminal made of Cu or an alloy of Cu, bus bars whose principal component is Al and bus bars whose principal component is Cu. Furthermore, it is also preferable to form the coupling structure by joining the positive external terminal made of Al or an alloy of Al, the negative external terminal made of Ni or an alloy of Ni, bus bars whose principal component is Al and bus bars whose principal component is Ni.

Figure 13A:
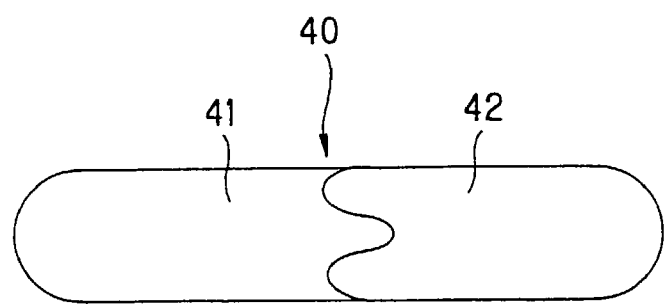
FIG. 13(a) shows a top view.
Figure 13B:
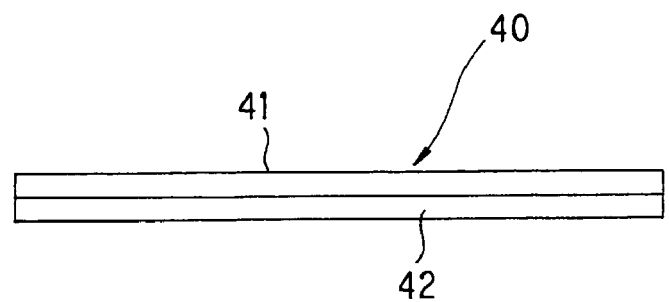
FIG. 13(b) shows a cross-sectional view showing an embodiment of bus bars of the assembled structure of lithium secondary batteries of the present invention.

In this case, it is preferable to use bus bars manufactured using at least one method selected from a group of methods of friction bonding, brazing, welding, caulking, rolling, forged caulking, press fitting, enveloped casting and blasting bonding. More specifically, as shown in FIG. 13(a), it is possible to manufacture a bus bar 40 by joining different types of metal by friction bonding an Al material 41 and a Cu or Ni material 42. Or as shown in FIG. 13(b), it is also possible to manufacture the bus bar 40 by pasting a tabular Al material 41 and a tabular Cu or Ni material 42 by brazing. In this case, it is preferable to allow the positive external terminal (Al material) of one lithium secondary battery and the negative external terminal (Cu material or Ni material) of another lithium secondary battery to contact a bus bar and join the respective external terminals and bus bar by welding. At this time, the positive external terminal made of Al is not joined with the Cu part of the bus bar but with the Al part. The negative external terminal made of Cu is not joined with the Al part of the bus bar but with the Cu part.

Furthermore, it is preferable that the assembled structure of lithium secondary batteries according to the present invention be made up of a plurality of lithium secondary batteries 10 placed side by side as shown in FIG. 12 and that depressurization holes 18 made in the caps 13 of the lithium secondary batteries 10 be on the same plane. Thus, if the depressurization holes 18 made in the caps 13 for the lithium secondary batteries 10 are on the same plane, this means that the positive and negative external terminals 15A and 15B of a plurality of lithium secondary batteries are also on the same plane, which means that it is only necessary to place the bus bars 40 on one side of the battery 10, which makes the coupling structure more compact, reduces the housing space and provides an excellent space-saving characteristic. Furthermore, with the simplified structure, it is possible to improve maintainability such as visual inspection and replacement of batteries and further simplify the battery fixing member. Furthermore, since the depressurization direction is already determined, it is possible to reduce influences of depressurization on other components.

As shown above, embodiments of the assembled structure of lithium secondary batteries of the present invention have been explained, but it goes without saying that the present invention is not limited to the above described embodiments. The configuration condition of the assembled structure of lithium secondary batteries of the present invention is ideally applicable to a lithium secondary battery with a cell capacity equal to or greater than 2 Ah. Moreover, it goes without saying that applications of the lithium secondary battery are not limited either and it is especially suitable as an assembled structure for a vehicle-mounted large capacity battery requiring high output, low internal resistance and excellent cycle characteristic to start the engine or to drive the motor of an electric-powered vehicle or hybrid electric-powered vehicle.

The lithium secondary battery of the present invention uses a cap as a cell sealing member or current leading member. Thus, there are no restrictions on other materials or cell structure. The principal members making up the cell and their structures will be explained briefly below.

The inner electrode body of the lithium secondary battery of the present invention is constructed of a positive electrode plate and negative electrode plate wound or laminated with a separator made of a porous polymer film inserted in between to prevent both plates from directly contacting with each other. More specifically, the roll type inner electrode body is constructed of the positive electrode plate 2 and negative electrode plate 3 wound with the separator 4 inserted in between and the current collector tables 5A and 5B are attached to the positive electrode plate 2 and negative electrode plate 3, respectively.

Both the positive electrode plate 2 and negative electrode plate 3 are formed like a wafer by applying respective electrode active materials to the current collector substrates. Examples of modes of the current collector substrate include foil and mesh, etc. and the present invention preferably uses an Al foil as a current collector substrate for the positive electrode plate 2 and a Cu foil or Ni foil as a current collector substrate for the negative electrode plate 3.

Furthermore, for a cell having any one of the above structures, lithium transition metal compound oxides such as lithium cobaltite ($LiCoO_2$), lithium nickelite ($LiNiO_2$) or lithium spinel manganate ($LiMn_2O_4$) are generally used as positive electrode active materials. In order to improve conductivity of these positive active materials, it is also preferable to mix carbon powder such as acetylene black or graphite powder with the electrode active materials. On the other hand, carbonaceous powder such as amorphous carbonaceous material such as soft carbon and hard carbon, natural graphite and artificial graphite are used as the negative active materials.

As the separator 4, a 3-layer structure with a lithium ion permeable polyethylene film having micro pores sandwiched by porous lithium ion permeable polypropylene films is preferably used. This also serves as a safety mechanism to suppress movement of lithium ions, that is, a cell reaction caused by a temperature rise of the internal electrode followed by softening of the polyethylene film at approximately 130° C. and collapse of micro pores. Then, by inserting this polyethylene film between polypropylene films having a higher softening temperature, it is possible to prevent contact/adhesion between the electrode plates 2 and 3.

As described above, the lithium secondary battery of the present invention adopts a configuration of placing positive and negative external terminals on one end of the battery and reduces protrusions of the battery, and can thereby improve a space-saving characteristic.

Furthermore, the lithium secondary battery coupling structure of the present invention adopts a configuration of placing positive and negative external terminals on one end of the battery, reduces protrusions of the battery and simplifies connections between the batteries, and can thereby improve a space-saving characteristic and productivity.

What is claimed is:

1. A lithium secondary battery comprising:
   an inner electrode body provided with a positive electrode plate and a negative electrode plate respectively made up of at least one metal foil wound or laminated, said inner electrode body being impregnated with a non-aqueous electrolyte;

current collector members for leading current out of said inner electrode body;

a battery case for housing said inner electrode body, said battery case having opposed open ends;

two caps for sealing said inner electrode body at both open ends of said battery case, each of said caps being provided with an internal terminal formed thereon, one of said two caps being electrically connected to said internal terminal formed thereon and being electrically connected to said battery case;

positive and negative external terminals formed on another one of said two caps, one of said external terminals being electrically connected to said another one of said two caps; and a depressurization hole formed on said one of said two electrode caps.

2. The lithium secondary battery according to claim 1, wherein said battery case is cylindrical.

3. The lithium secondary battery according to claim 1, wherein said battery case is a tube.

4. The lithium secondary battery according to claim 1, wherein said cell further comprises a hollow cylindrical core, and both said positive electrode plate and said negative electrode plate are wound around the periphery of said core.

5. The lithium secondary battery according to claim 1, wherein a necking section is formed in an area closest to the outer edge of at least one of the caps.

6. The lithium secondary battery according to claim 4, wherein said depressurization hole is formed on a position of the cap corresponding to the center axis of said core.

7. The lithium secondary battery according to claim 6, wherein the center axis of said core is coaxial with the center axis of said battery case.

8. The lithium secondary battery according to claim 4, wherein said core is made of Al or an alloy of Al.

9. The lithium secondary battery according to claim 1, wherein said depressurization hole is positioned on a portion of the cap to enable it to serve as an electrolyte inlet at the time of assembly.

10. The lithium secondary battery according to claim 4, wherein said core includes one or more holes or slits that communicate with an interior of said battery case.

11. The lithium secondary battery according to claim 1, wherein said cap on which the positive and negative external terminals are formed is constituted by sandwiching an electrically insulating elastic body therebetween, thereby the positive and negative electrodes are electrically insulated.

12. The lithium secondary battery according to claim 11, wherein said elastic body is a packing being processed to a predetermined size.

13. The lithium secondary battery according to claim 12, wherein said packing is made from a member selected from the group consisting of ethylene propylene rubber, polyethylene, polypropylene and fluorocarbon resin.

14. The lithium secondary battery according to claim 1, wherein a joint between said battery case and said caps is a caulked one, a welded one or a combination thereof.

15. The lithium secondary battery according to claim 1, wherein that said battery case is a positively charged one.

16. The lithium secondary battery according to claim 15, wherein said battery case is made of Al or an alloy of Al.

17. The lithium secondary battery according to claim 4, wherein the cap in which said depressurization hole is formed includes a tabular member having the function as a cover, an elastic body processed to a predetermined size, a metal foil and a spacer, said elastic body and said metal foil are placed at predetermined positions and combined with said spacer to form a depressurization mechanism unit, and said depressurization mechanism unit is fitted into said tabular member.

18. The lithium secondary battery according to claim 1, wherein said current collector member is a plurality of strip-shaped current collector tabs and formed by attaching one end of said plurality of strip-shaped current collector tabs to the edge of said at least one metal foil making up said positive electrode plate and/or said negative electrode plate.

19. The lithium secondary battery according to claim 18, wherein the other end of said plurality of strip-shaped current collector tabs is connected to said internal terminal.

20. The lithium secondary battery according to claim 1, wherein said current collector member is a current collector member of a predetermined shape, the edges of said at least one metal foil making up said positive electrode plate and/or said negative electrode plate are joined with predetermined locations of said current collector member to lead a current out of said inner electrode body, and of the edges of said metal foil, the joint edges arranged to be joined with said predetermined locations of said current collector member are joined with said predetermined locations of said current collector member.

21. The lithium secondary battery according to claim 20, wherein said current collector member is connected to said internal terminal via an electrode lead member.

22. The lithium secondary battery according to claim 1, wherein said positive external terminal and said negative external terminal are made of different types of metal.

23. The lithium secondary battery according to claim 22, wherein said positive external terminal is Al or an alloy of Al and said negative external terminal is Cu or an alloy of Cu.

24. The lithium secondary battery according to claim 23, wherein said positive external terminal is Al or an alloy of Al and said negative external terminal member is Ni or an alloy of Ni.

25. The lithium secondary battery according to claim 1, wherein the cell capacity is 2 Ah or above.

26. An assembled structure of lithium secondary batteries, which comprises a plurality of the lithium secondary batteries according to claim 1, characterized in that a positive external terminal of any one of said plurality of lithium secondary batteries is connected with a negative external terminal of a lithium secondary battery other than said lithium secondary battery having this positive external terminal using a bus bar.

27. The assembled structure of lithium secondary batteries according to claim 26, wherein said bus bar is formed by joining different types of metal.

28. The assembled structure of lithium secondary batteries according to claim 27, wherein said positive external terminal is Al or an alloy of Al and said negative external terminal member is Cu or an alloy of Cu and said bus bar is formed by joining a material whose principal component is Al and another material whose principal component is Cu.

29. The assembled structure of lithium secondary batteries according to claim 27, characterized in that said positive external terminal is Al or an alloy of Al and said negative external terminal member is Ni or an alloy of Ni and said bus bar is formed by joining a material whose principal component is Al and another material whose principal component is Ni.

30. The assembled structure of lithium secondary batteries according to claim 26, wherein said bus bar is one manufactured by using at least one method selected from a group of methods of friction bonding, brazing, welding, caulking, rolling, forged caulking, press fitting, enveloped casting and blasting bonding.

31. The assembled structure of lithium secondary batteries according to claim 26, wherein said plurality of lithium secondary batteries are placed side by side and said depressurization holes provided in said caps of said lithium secondary batteries are on same plane.

32. The assembled structure of lithium secondary batteries according to claim 26, wherein the cell capacity of a lithium secondary battery each is 2 Ah or above.

* * * * *